S. T. TAYLOR.
Feed-Water Heaters for Steam-Boilers.
No. 138,957.  Patented May 13, 1873.
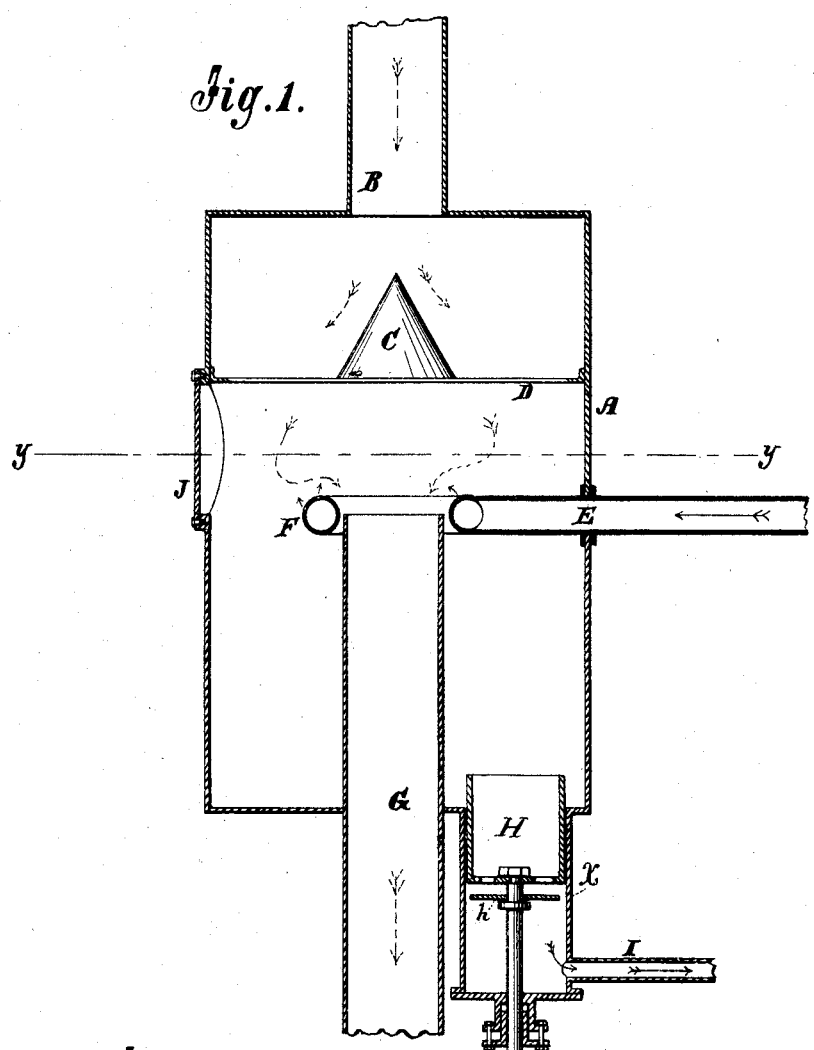
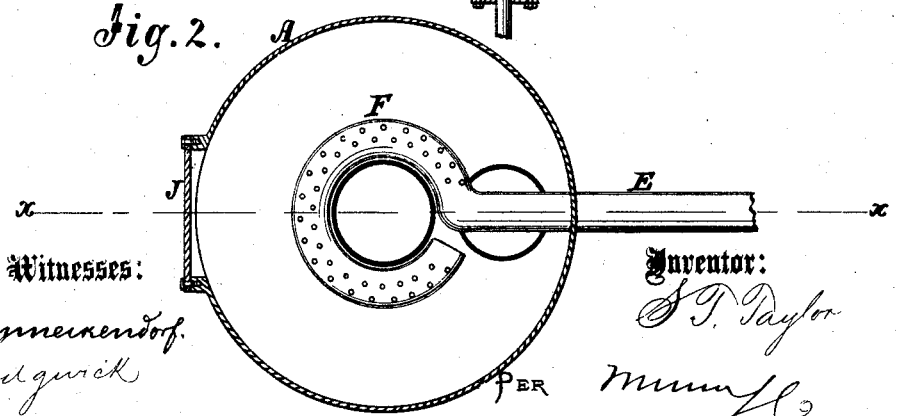

UNITED STATES PATENT OFFICE.

SIDNEY T. TAYLOR, OF BALTIMORE, MARYLAND.

IMPROVEMENT IN FEED-WATER HEATERS FOR STEAM-BOILERS.

Specification forming part of Letters Patent No. 138,957, dated May 13, 1873; application filed February 21, 1873.

*To all whom it may concern:*

Be it known that I, SIDNEY T. TAYLOR, of Baltimore, in the county of Baltimore and State of Maryland, have invented a new and useful Improvement in Feed-Water Heaters, of which the following is a specification.

My invention consists in a new arrangement of a cone and induction and eduction exhaust-steam pipes or tubes, with a perforated circular water-discharge pipe, within a case or cylinder, whereby a very thorough absorption of heat by the water, and corresponding condensation of the steam, is assured. It also consists in providing a well at the bottom of the aforesaid case and arranging a piston and valve therein, so that the water accumulating in the case may be entirely removed, as hereinafter described.

In the accompanying drawing, Figure 1 represents a longitudinal section taken on the line $xx$ of Fig. 2, showing the general construction of the apparatus. Fig. 2 is a cross-section of Fig. 1, taken on the line $y y$.

Similar letters of reference indicate corresponding parts.

A is the casing or heating vessel. B is the pipe for the exhaust steam from the engine. C is a cone, arranged on a support, D, with its apex directly opposite the steam-opening B, for properly dispersing the steam in the heating-chamber. E is the water-pipe connecting with the cold-water supply, passing through the casing and turned in a perforated circle, F, which surrounds the discharge-tube G, as seen in the drawing. The cold water is discharged through these perforations, forming a ring of fine jets or streams, which the steam (being dispersed or spread by the cone, so as to form an annular sheet) intersects as it is drawn toward the mouth of the tube G. In this manner the absorption of heat and condensation of steam is very thorough, or more nearly complete than has been heretofore practicable with so simple means. A small vertical cylinder, $x$, is attached to the bottom of the case A, and a perforated piston, H, provided with a valve, $h$, working up and down on the rod, is arranged therein. The rod works through an ordinary stuffing-box in the end of the cylinder. The piston is in the form of a hollow cylinder, open at its upper end. It is apparent that the water accumulating in the case may be thus entirely removed, and, since the pump is enabled to act by gravity of the water, it can never fail to work, as is often the case in suction-pumps, owing to the destruction of the vacuum by steam.

Having thus described my invention, what I claim as new, and desire to secure by Letters Patent, is—

1. The induction and eduction steam tubes B G, annular perforated water-discharge tube F, and the cone C, combined as herein described, whereby the annular sheets of steam and water are caused to intersect, as specified.

2. The vertical well or cylinder attached to the bottom of the case A, and provided with the perforated piston H and valve $h$, as shown and described, for the purpose specified.

SIDNEY T. TAYLOR.

Witnesses:
JAMES WHITEHOUSE,
C. W. SMITH.